United States Patent [19]

Bartos

[11] 4,260,417
[45] Apr. 7, 1981

[54] BATCH DESULFURIZATION IN A CORELESS INDUCTION FURNACE

[75] Inventor: Thomas E. Bartos, Woodhaven, Mich.

[73] Assignee: Ford Motor Company, Dearborn, Mich.

[21] Appl. No.: 90,952

[22] Filed: Nov. 5, 1979

[51] Int. Cl.³ .................. C22C 33/08; C21C 7/02; C22B 4/00
[52] U.S. Cl. .................. 75/130 R; 75/10 R; 75/53; 75/58
[58] Field of Search .............. 75/53, 58, 130 R, 10–12

[56] References Cited

U.S. PATENT DOCUMENTS

| | | |
|---|---|---|
| 3,055,753 | 9/1962 | Matuschkovitz .............. 75/130 R |
| 3,124,450 | 3/1964 | Matuschkovitz .............. 75/130 R |
| 3,929,464 | 12/1975 | Todd .............................. 75/58 |

Primary Examiner—P. D. Rosenberg
Attorney, Agent, or Firm—Joseph W. Malleck; Olin B. Johnson

[57] ABSTRACT

A method of internal furnace desulfurization of molten metal is disclosed. Into a furnace lined with alumina-chrome refractory material, a charge is introduced comprised of scrap metal, alloying ingredients, and 0.5–3% by weight calcium carbide. The charge is melted and superheated to form a desired solution. The molten metal is then deslaged to remove sulfur and other impurities.

4 Claims, 1 Drawing Figure

U.S. Patent          Apr. 7, 1981          4,260,417
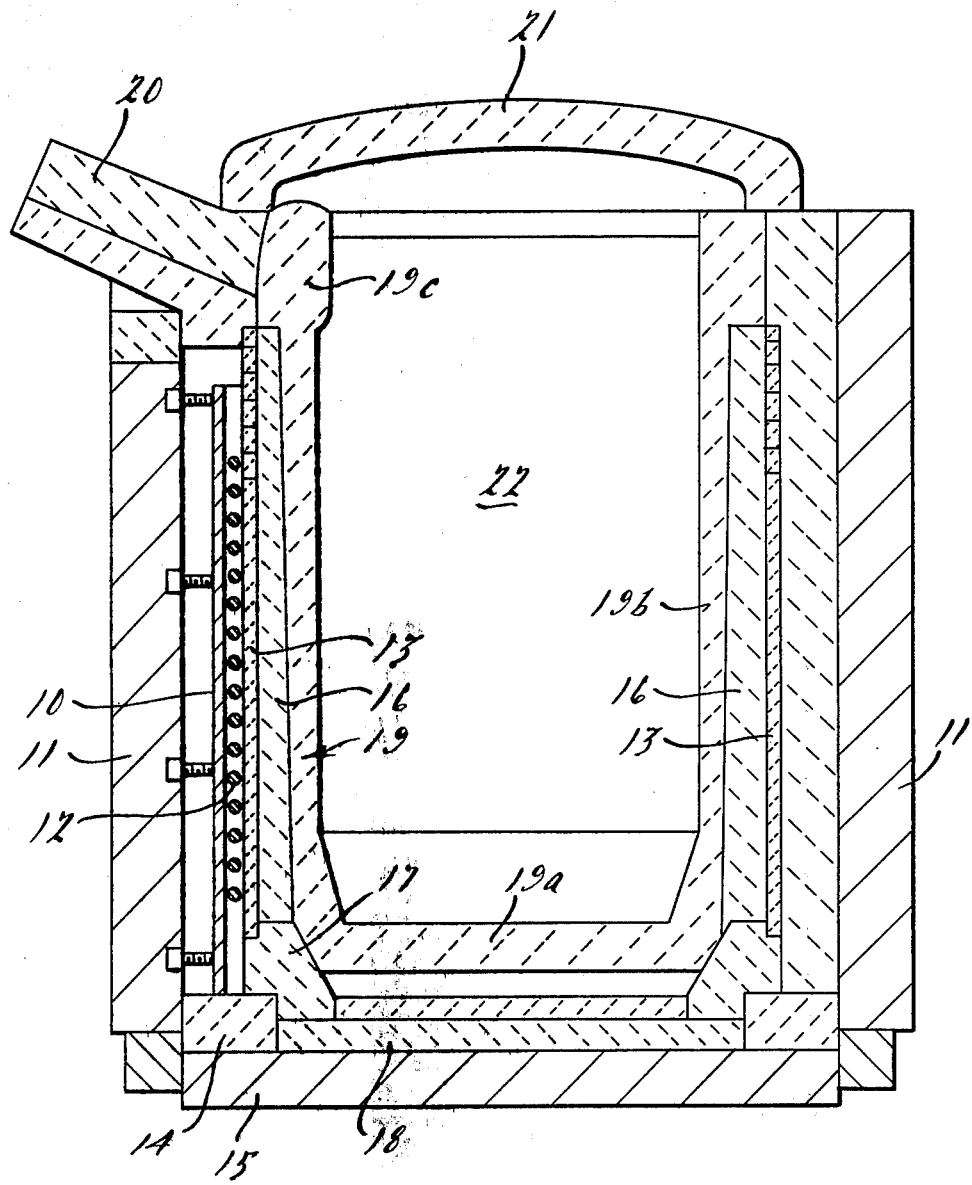

BATCH DESULFURIZATION IN A CORELESS INDUCTION FURNACE

BACKGROUND OF THE INVENTION

Coreless induction furnaces have been used to date as a melt unit in the production of ductile iron. Treatment of the molten metal has always taken place outside of the induction furnace. This method produces a variable temperature condition of the molten metal during treatment in the separate vessel, leading to certain temperature losses, and produces a variable final sulfur level which is in part dependent upon the variable temperature condition. These variable conditions can lead to the generation of scrap castings. Treatment of the metal outside of the furnace, of course, requires the use of a desulfurizing agent or slag as well as the use of an agent for graphitizing the metal.

The coreless induction furnace has never been visualized as a unit for the direct production of ductile iron utilizing a normal furnace operational mode. This may be due in part to the fact that such furnaces have been traditionally lined with silica as dictated by furnace manufacturers seeking to keep costs low; silica is acid in nature and would be attacked by desulfurizing agents which are generally basic in nature if used in the furnace. Thus, silica being an extremely economical lining material and having sufficient structural strength, has been the dominant furnace refractory lining material for a number of years.

The coreless induction furnace has not been employed for the direct production of ductile iron for other reasons, such as: the extreme high cost of low sulphur content charge material, and the extremely stringent process controls that are required even with low sulfur content charge material. Desulfurizing agents, used traditionally for ductile iron treatment, are typically basic in nature, including sodium carbonate, quick-lime (CaO) and calcium carbide. In many cases these desulfurizing agents are mixed with other alkaline materials. Their strong chemical activity has caused the foundry industry to employ vessels which are suitably lined independent of the furnace to resist such chemical activity.

A refractory lining which is more chemically neutral to desulfurizing agents is alumina-chrome refractory material; it has heretofore been used in the steel making process such as evidenced by U.S. Pat. No. 4,039,344. Alumina-chrome refractory means a refractory composition about 30 to about 60 weight percent alumina and about 40 to about 70 weight percent of a chrome comprising material such as chrome ore, chrome magnesia clinker or chrome magnesia brick scrap. Suitable alumina-chrome refractory for this purpose is disclosed in U.S. Pat. No. 4,039,344 which is incorporated herein by reference as a teaching of such material.

In the steel making process, the chemistry of the molten metal is of the following nature:

| Typical Metal Chemistry | | Typical Slag Chemistry | |
|---|---|---|---|
| Element | % | Compound | % |
| Carbon | .1–1.5 | Aluminum Oxide | 5 |
| Silicon | .1–1.5 | Silicon Oxide | 26 |
| Manganese | .1–1.0 | Calcium Oxide | 56 |
| Chrome | .1–1.0 | Magnesium Oxide | 10 |
| Sulphur | .03–.3 | | |

The use of alumina-chrome refractory with the aforementioned chemistry would not indicate its utility in the environment of a melting facility for a foundry where the molten metal and slag have a different chemistry such as:

| Typical Metal Chemistry | | Typical Slag Chemistry | |
|---|---|---|---|
| Element | % | Compound | % |
| Carbon | 3.25–4.0 | Aluminum Oxide | 10 |
| Silicon | 2.0–2.5 | Silicon Oxide | 42.5 |
| Manganese | .3–1.0 | Calcium Oxide | 32.0 |
| Chrome | .1–1.0 | Magnesium Oxide | .5 |
| Sulphur | .03–.1 | | |

Accordingly, the use of alumina-chrome refractory in a coreless induction furnace has not been visualized because (a) the thermal expansion characteristics of the material have not been predictable in a different environment, (b) inability to cure the material in a changed environment, and (c) lack of a satisfactory installation method in a coreless induction furnace.

Thus, even though alumina-chrome refractory material is known and strongly basic desulfurizers have been employed heretofore in separate treatment ladles, it has never occurred to the prior art that preparation of a ductile iron can be directly provided in a coreless induction furnace in view of the above problems.

SUMMARY OF THE INVENTION

The invention relates to a method for melting and refining ferrous metals in a furnace, particularly in coreless induction furnaces. The furnace is lined with an alumina-chrome refractory which provides improved resistance to erosion by action of a slag containing products resulting from the addition of calcium carbide. The charge to such furnace includes 0.5–3% calcium carbide as a desulphurizing agent, sized to 16 mesh or less. With this method, low sulfur irons or steels may be produced with less cost and less wear on the furnace vessel.

A primary object of this invention is to provide an acceptable method of making ductile iron directly in a coreless induction furnace.

Another object of this invention is to provide an improved apparatus for carrying out desulfurization and graphitization of molten iron for the production of ductile iron directly in a coreless induction furnace, the apparatus promoting a greater resistance to chemical attack of the desulfurizer and graphitizing agent.

Yet another object of this invention is to provide more continuous productivity in the manufacture of ductile or grey iron.

Yet still another object of this invention is to provide a method of making one or more types of cast iron within the same apparatus or facility. This could involve making grey as well as ductile iron from the same unit, all with an economy that is equal to or greater than that accomplished to date.

SUMMARY OF THE DRAWINGS

FIG. 1 is a central sectional elevational view of a coreless induction furnace embodying the principles of the present invention, said furnace being employed for the direct production of ductile iron.

DETAILED DESCRIPTION

A preferred mode for carrying out internal desulfurization in accordance with this invention is to carry out the process in a coreless induction furnace lined with a layer of alumina-chrome refractory backed up with a layer of silica refractory, said mode comprising the following steps:

(a) introducing a metal charge to the furnace which is comprised of high sulfur pig iron, a small percentage of low carbon steel and a small addition of ferrous silicon. To this base charge, an additional quantity of dry or oily metal borings is added;

(b) adding a desulfurization agent consisting of (by weight of the charge) 0.5–3% calcium carbide, having a granular size of 16 mesh or less;

(c) melting the charge and superheating to form an iron solution;

(d) removing the slag layer from the molten metal; and (e) tapping molten metal from the furnace into a ladle for conveyance to the molding operation.

To prove out the ability to achieve low sulfur levels with the present invention, a series of four trials were undertaken. For each of these trials the induction furnace was prepared as shown in FIG. 1. The furnace has an outer metal shell 10 formed of high performance plate steel. The shell is supported by a framework 11 and sits on a refractory ring 14 supported in turn on a platform 15. Immediately interior of the metal plate shell, a series of electrical induction coils 12 are mounted (and connected to a suitable power source) for carrying out the heating and stirring effect desired within the furnace. Next an insulator board 13 is placed interior of the coils which is generally comprised of ceramic fibrous and highly siliceous asbestos fibers; the insulation board generally has a thickness of ¾ inch. Immediately adjacent to the insulator board is a wall 16 of silica refractory having a thickness generally in the range of 4–6 inches. The insulation board and silica wall are supported on a preformed silica base 17 which in turn is mounted on a preformed block 18. The interior facing or lining 19 of the furnace is provided by a 4–7 inch layer of refractory consisting of alumina-chrome. To achieve such interior lining, a base crucible 19a is formed which would constitute the lower portion of the lining or the bottom of the furnace chamber. Once this crucible configuration has been formed by such material, a cylindrical wall 19b is built thereon which extends upward to the slag line and slightly thereabove. The rim 19c or zone above the slag line level, is then provided with a double layer of alumina-chrome refractory having a thickness of about 8–10 inches. A suitable tapping spout 20 (of alumina-chrome) is placed for access to the chamber interior. A refractory cover 21 is rested on the furnace walls to close the chamber 22.

The alumina-chrome refractory may contain 50–95% by weight of alumina, with the major portion in coarse particle size, and 7–20% by weight of chrome-type material, with the major part of the latter in fine particle size. In some modifications, the alumina-chrome composition may additionally contain about 20% by weight of a material which is highly refractory such as zircon, zirconium, magnesia, spinel, clay, silicon carbide and titanium oxide in fine particle size ranges. For the alumina component, the material may be synthetic mullite, sillimanite, syanite, andalusite, diaspore, bauxite and other alumina shales. The coarse size range for the particles of alumina is greater than 1 millimeter. For the chrome-type material, it may be constituted of $Cr_2O_3$ in the form of chrome ore, chrome-magnesia clinker and chrome-magnesia brick scrap.

A series of melts were performed to substantiate the inventive effect of SiC and alumina-chrome refractory consisting of 85% mullite and 15% chrome ore. Each of the trials used a 250 lb. melt made in a coreless induction furnace lined with the alumina-chrome material. The total time for the sequence of each trial was about 1.75 hours, and the tap temperature was 2800° F. For the first trial, the initial charge make-up consisted of sorel pig iron at 195 lbs., low carbon steel at 4.5 lbs. and ferro-silicon at 0.5 lbs. This 200 lb. charge was introduced to the furnace and cold melted. The desulfurizer for trial one was desulphex which chemically consists of: 59.5% calcium, 11.5% florine, 3.5% oxygen, 2.0% sodium and the remainder trace elements.

The following sequence then took place.
Take spectrometer sample
Charge 50 lbs. of oily borings and melt
Take spectrometer sample
Tap 50 lbs from furnace
Charge 50 lbs of oily borings and desulfurizer, melt and superheat to 2800° F.
Hold 10 min.
Take spectrometer sample.
Slag furnace
Add 1% desulfurizer
Take spectrometer sample
Tap furnace The analysis of the spectrometer readings were as follows:

| Element | Sample #1[1] | Sample #2[2] | Sample #3[3] | Sample #4[4] |
|---|---|---|---|---|
| Carbon | 3.87 | 3.66 | 3.60 | 3.58 |
| Silicon | 2.08 | 2.03 | 1.93 | 1.95 |
| Manganese | .28 | .36 | .41 | .42 |
| Chromium | .05 | .09 | .12 | .12 |
| Sulfur | .011 | .025 | .016 | .014 |
| Phosphorus | .030 | .034 | .033 | .032 |
| Aluminum | .033 | .010 | .002 | .010 |
| Titanium | .017 | .023 | .024 | .026 |

[1]Sample #1 was the base melt
[2]Sample #2 was the base melt plus 50 lbs of oily borings
[3]Sample #3 was the base melt plus 100 lbs of oily borings and 2.5 lbs. of desulphex-theoretical level prior to desulfurization .036
[4]Sample #4 was taken after the furnace was slagged and 2.5 pounds of Desulphex added.

A second trial was undertaken which followed the same procedure as that for trial one except that the desulfurizer constituted burnt lime. The qualitative results showed little or no desulfurization was accomplished; this was substantiated by the undissolved lime particles in the slag layer of the melt. Based on the performance of the burnt lime, the use of burnt or dolomitic lime as a desulfurization agent was eliminated from further testing. The spectrographic analysis of the four samples for the second trial was as follows:

| Element | Sample #1[1] | Sample #2[2] | Sample #3[3] |
|---|---|---|---|
| Carbon | 3.90 | 3.57 | 3.28 |
| Silicon | 2.25 | 2.12 | 1.83 |
| Manganese | 0.30 | 0.27 | 0.31 |
| Chromium | 0.05 | 0.06 | 0.08 |
| Sulfur | 0.012 | 0.022 | 0.029 |
| Phosphorus | 0.033 | 0.039 | 0.039 |
| Aluminum | 0.010 | 0.006 | 0.005 |
| Titanium | 0.018 | 0.017 | 0.015 |

[1]Base Melt
[2]Base Melt + 50 lbs of dry borings
[3]Base Melt + 100 lbs of dry borings + 2.5 lbs burnt lime For the third trial, the same procedure as in trial one was employed, except that the desulfurization agent used was calcium carbide of a coarse foundry grade. The results indicated that some desulfurization was accomplished (from 0.028% to 0.02%) but the level reached was not acceptable for a production situation. As part of the invention, it was suggested that a fine powdered material be employed to improve the performance of the calcium carbide. The spectrographic analysis from trial three was as follows:

| Sample Element | A[1] | B[2] | C[3] | D[4] |
|---|---|---|---|---|
| Carbon | 3.93 | 3.58 | 3.28 | 3.30 |
| Silicon | 2.07 | 1.81 | 1.59 | 1.60 |
| Manganese | 0.33 | 0.30 | 0.28 | 0.30 |
| Chromium | 0.05 | 0.06 | 0.07 | 0.07 |
| Sulfur | 0.015 | 0.022 | 0.028 | 0.020 |
| Phosphorus | 0.042 | 0.038 | 0.036 | 0.042 |
| Aluminum | 0.011 | 0.005 | 0.003 | 0.005 |
| Titanium | 0.019 | 0.018 | 0.015 | 0.016 |

[1] Base melt
[2] Base melt + 50 lbs of dry borings
[3] Base melt + 100 lbs of dry borings and 2.5 lb Calcium Carbide
[4] Base melt + 100 lbs of dry borings and 5.0 lbs Calcium Carbide Trial four employed a desulfurization agent in the form of calcium carbide, size 16 mesh and down. The 1% addition of this agent to the furnace bath desulfurized the metal from 0.025% to 0.008%. This level was very acceptable for a production process. The sequence employed for this last trial was as follows:

Charge the furnace with 200 lbs of cold melt stock
Melt down and superheat to 2800° F.
Sample the furnace (Sample A)
Add 50 lbs of loose, dry borings.
Superheat to 2800° F.
Sample the furnace (Sample B)
Add 50 lbs of loose, dry borings and 2.5 lbs of find particle size Calcium Carbide.
Superheat to 2800° F.
Sample the furnace (Sample C)
Slag the furnace.
Add 2.5 lbs of fine particle size Calcium Carbide
Superheat to 2800° F.
Sample the furnace (Sample D).

And the spectrographic analysis for the fourth trial was as follows:

| Sample Element | A[1] | B[2] | C[3] | D[4] |
|---|---|---|---|---|
| Carbon | 3.97 | 3.60 | 3.38 | 3.33 |
| Silicon | 1.94 | 1.81 | 1.59 | 1.56 |
| Manganese | .36 | .31 | .34 | .35 |
| Chromium | .05 | .06 | .07 | .07 |
| Sulfur | .011 | .019 | .013 | .008 |
| Phosphorus | .035 | .033 | .033 | .034 |
| Aluminum | .010 | .006 | .007 | .008 |
| Titanium | .019 | .017 | .014 | .015 |

[1] Base melt
[2] Base melt + 50 lbs of dry borings
[3] Base melt + 100 lbs of dry borings + 2.5 lbs Calcium Carbide
[4] Base melt + 100 lbs of dry borings + 5.0 lbs Calcium Carbide The calcium carbide preferrably should be pure, but may contain other additives such as calcium hydroxide, aluminum hydroxide, clay, perlite, kaolin, a carbohydrate, phtalic acid, glucolic acid or polyalcohol, each of which yield water at desulfurization temperatures and thus aid the process.

The essential aspects of the external desulfurization and internal desulfurization for a 250 ton heat is compared below:

EXTERNAL DESULFURIZATION
ASSUMPTIONS:

| Furnace is lined with silica refractory | |
|---|---|
| Charge make up: | |
| Dry borings | 60% |
| Steel | 35% |
| Alloys & Carbon Raiser | 5% |
| Tap temperature is 2000° F. | |

METAL TREATMENT PROCESS:
Furnace is slagged prior to tap
Tap furnace into a pouring ladle equipped with porous plug
Move ladle to desulfurization station
Hook up nitrogen line to porous plug
Turn on nitrogen (25 psi at 150 SCFM)
Add 41 lb. (16%) CaC to top of ladle
Bubble for 2.0 min.
Turn off nitrogen
Unhook ladle
Slag off ladle
Move to line and pour ladle into molds prepared for instant nodular production.

INTERNAL DESULFURIZATION
ASSUMPTIONS:

| Furnace is lined with alumina-chrome refractory | |
|---|---|
| Charge Make up: | |
| Dry borings | 60% |
| Steel | 34% |
| Alloys & Carbon Raiser | 5% |
| Desulfurizer (CaC) | 1% |
| Tap temperature is 2800° F. | |

METAL TREATMENT PROCESS:
The last charge to the furnace prior to tap contains 1.0% desulfurizing agent (CaC)
Furnace is slagged prior to tap
Tap furnace into pouring ladle
Slag ladle
Move ladle to mold line and pour into molds prepared for instant nodular production The terms "superheat" and "superheating" as used herein mean heating to a temperature in excess of the melting temperature of the metal. The superheat compensates for loss of heat of the molten metal during handling and transfer so that it remains in a molten solution form before being cast.

I claim:
1. A method of internal furnace batch type desulfurization of molten metal comprising:
   (a) introducing into a furnace, lined with alumina-chrome refractory material, a charge consisting essentially of ferrous metal units, at least a portion of which is in the form of scrap iron, alloying ingredients and 0.5-3% by weight calcium carbide,
   (b) melting said charge and superheating the melted charge to form an iron solution,
   (c) deslaging said molten metal to remove slag containing sulfur and other impurities.
2. The method as in claim 1 in which said alloying ingredients constitute about 5% of said charge.

3. A method of internal furnace desulfurization of molten ferrous metal to form grey iron, comprising:
   (a) introducing into a coreless induction furnace, lined throughout the interior crucible with alumina-chrome refractory material of a thickness of at least 4 inches, a cold charge consisting of about 60% ferrous machining scrap metal, about 34% steel scrap, about 5% alloys and carbon raisers, and 1% calcium carbide,
   (b) melting said charge,
   (c) superheating said molten metal to 2800° F. and slag said molten material, said molten metal having a chemical content which provides grey iron on solidification.

4. A method of producing nodular castings by internal furnace desulfurization of molten metal and internal nodularization of the desulfurized molten metal within the mold, comprising:
   (a) introducing into a coreless induction furnace, lined throughout the interior crucible with alumina-chrome refractory material of a thickness of at least 4 inches, a cold charge consisting of 5% alloys and carbon raisers, and 1% calcium carbide, and the remainder scrap ferrous metal,
   (b) melting said charge and adding an additional 1% calcium carbide,
   (c) superheating said molten metal to 2800° F., slagging said metal leaving the molten metal with a sulfur content of less than 0.01% and a chemical content that would provide grey iron upon solidification,
   (d) tapping said molten metal into a ladle and moving said ladle to a mold line where it is promptly poured into molds prepared for instant nodular treatment of the poured metal, said molds having a predetermined supply of nodularizing agent deposited in a reservoir through which the molten metal must transgress in order to reach the mold cavity.

* * * * *